United States Patent
Bureacov et al.

(10) Patent No.: US 10,295,760 B1
(45) Date of Patent: May 21, 2019

(54) OPTICAL TRACEABLE PATCH CORD

(71) Applicant: AFL IG LLC, Duncan, SC (US)

(72) Inventors: Artur Bureacov, Tacoma, WA (US); Asher Leong Raven, Milton Keynes (GB)

(73) Assignee: AFL IG LLC, Duncan, SC (US)

(*) Notice: Subject to any disclaimer, the term of this patent is extended or adjusted under 35 U.S.C. 154(b) by 2 days.

(21) Appl. No.: 15/975,105

(22) Filed: May 9, 2018

Related U.S. Application Data (60) Provisional application No. 62/620,805, filed on Jan. 23, 2018.

(51) Int. Cl.
  *G02B 6/38* (2006.01)
  *G02B 6/44* (2006.01)
  *H01R 13/717* (2006.01)

(52) U.S. Cl.
  CPC ......... *G02B 6/3895* (2013.01); *G02B 6/3825* (2013.01); *G02B 6/447* (2013.01); *G02B 6/4416* (2013.01); *H01R 13/717* (2013.01)

(58) Field of Classification Search
  CPC .. G02B 6/3895; G02B 6/3825; G02B 6/4416; G02B 6/447; H01R 13/717
  USPC .......................................................... 385/53
  See application file for complete search history.

(56) References Cited

U.S. PATENT DOCUMENTS

| | | | | |
|---|---|---|---|---|
| 4,792,679 A | * | 12/1988 | Bissegger | G01D 5/366 250/231.1 |
| 2002/0097964 A1 | * | 7/2002 | Roehrs | B41J 2/175 385/59 |
| 2011/0034068 A1 | * | 2/2011 | Russell | G02B 6/3895 439/488 |
| 2018/0045894 A1 | * | 2/2018 | Takahashi | G02B 6/387 |
| 2018/0136398 A1 | * | 5/2018 | Bauco | G02B 6/0006 |

* cited by examiner

*Primary Examiner* — Jerry M Blevins
(74) *Attorney, Agent, or Firm* — Dority & Manning, P.A.

(57) ABSTRACT

An optically traceable patch cord includes a cable extending from a first connector at a first end to a second connector at a second end. A trace assembly in the cable is located between the first end of the cable and the second end of the cable. An optical tracing fiber extends from the trace assembly to one of the first connector and the second connector.

18 Claims, 7 Drawing Sheets

OPTICAL TRACEABLE PATCH CORD

CROSS-REFERENCE TO RELATED APPLICATIONS

This application is based upon and claims the benefit of priority from U.S. Provisional Patent Application No. 62/620,805, filed Jan. 23, 2018, the disclosure of which is incorporated by reference herein in its entirety.

FIELD

The present disclosure relates to a patch cord with features for optically tracing the patch cord and identifying at least one end of the patch cord.

BACKGROUND

In high density patching applications in a data center, it is very difficult to determine the two ends of the patch cord that are plugged into active equipment or patch panels. Given a large number of patch cords in a relatively small area, where each patch cord has a connector on both ends, and the connectors are all plugged in, it can be challenging to identify which connector in a first area corresponds to another connector in a second area spaced apart from the first area. If you need to remove one end of the patch cord, it can be very difficult to determine which port the other end of the patch cord is connected to and which port will be affected.

There are copper traceable patch cords that use an individual copper cable inside of the cable jacket to transmit an electrical signal down the length of the patch cord. However, where the patch cord is an optical fiber patch cord, this solution requires specialized testing equipment which can provide electric power for the copper trace as well as a light source for testing the optical fibers.

Some optically traceable patch cords require connecting tracing equipment, e.g., a light source and/or light meter, to the connectors. When the connectors are plugged in, and particularly when the connectors are included with several other connectors in a high density application, such optically traceable patch cords can be difficult to use. For example, it can be difficult to make a good connection between the light source and the connector of interest when the connector of interest is surrounded by numerous other connectors in a tight space.

Accordingly, an improved optically traceable patch cord is desirable. For example, a patch cord including one or more features to allow easy and efficient optical identification of an end of the patch cord and/or a connector thereon would be useful.

BRIEF DESCRIPTION

Aspects and advantages of the invention are set forth below in the following description, or may be obvious from the description, or may be learned through practice of the invention.

In one exemplary aspect of the present disclosure, an optical traceable patch cord is provided. The optical traceable patch cord includes a cable extending from a first connector at a first end to a second connector at a second end. A trace assembly is provided in the cable between the first end of the cable and the second end of the cable. The trace assembly is proximate the first connector and spaced from each of the first connector and the second connector. An optical fiber extends from the trace assembly towards the second end of the cable.

In another exemplary aspect of the present disclosure, a method of tracing a patch cord is provided. The patch cord includes a cable extending from a first connector to a second connector. The method includes emitting light into an optical tracing fiber at a trace assembly in the patch cord. The trace assembly is spaced from each of the first connector and the second connector and proximate the first connector. The method also includes transmitting the light through the optical tracing fiber towards the second connector.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof to one skilled in the art, is set forth more particularly in the remainder of the specification, including reference to the accompanying figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 1:
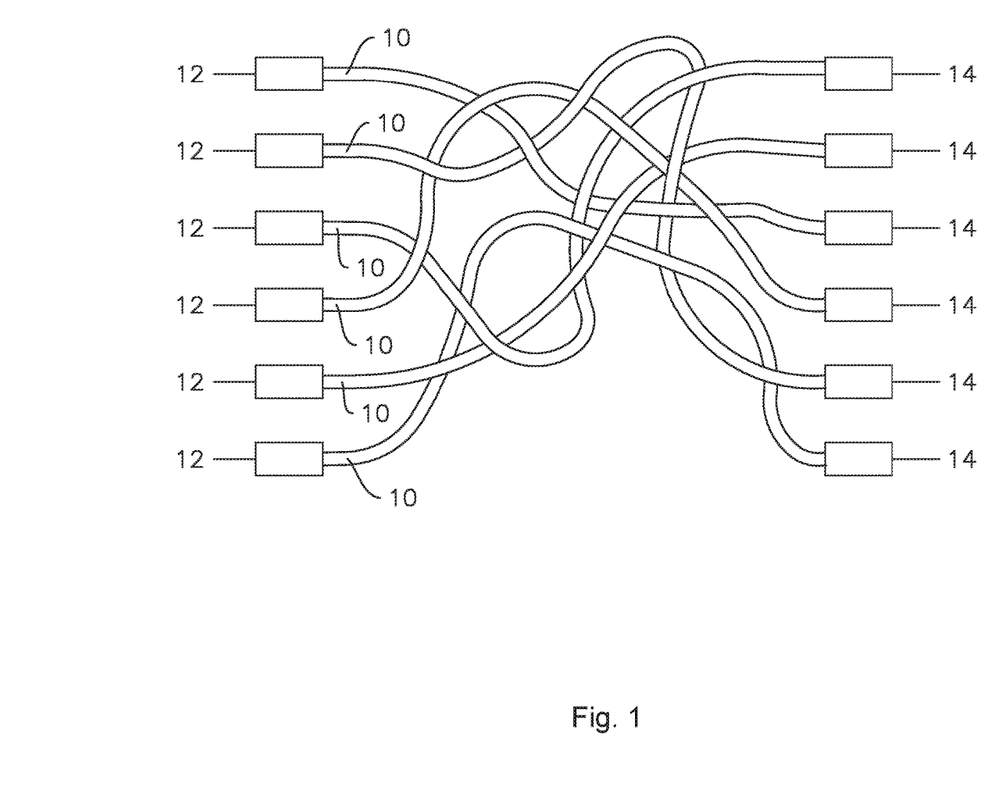
FIG. 1 is a view of a plurality of patch cords in a high-density patching application.

FIG. 1 illustrates a plurality of patch cords 10, each of which extends from a first connector 12 at a first end of the respective patch cord 10 to a second connector 14 at a second end of the respective patch cord. The first and second ends of each patch cord 10 are opposite one another. As can be seen in FIG. 1, a high density of patch cords 10 can lead to the patch cords 10 becoming interwoven, entangled, and otherwise jumbled such that when disconnecting a connector, e.g., one of the first connectors 12, a corresponding connector, e.g., the second connector 14 of the same patch cord 10, cannot be readily identified from among the teeming multitude of patch cords 10.

Figure 2:
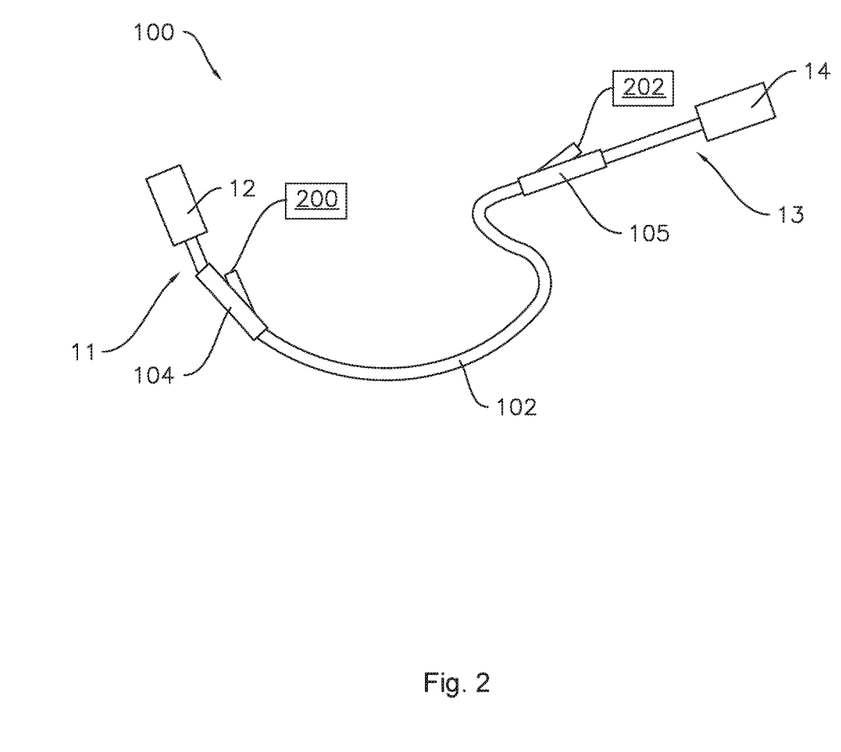
FIG. 2 is a view of an exemplary optically traceable patch cord according to one or more embodiments of the present disclosure.

FIG. 2 illustrates an exemplary patch cord 100 according to one or more embodiments of the present disclosure. For example, the patch cord 100 of FIG. 2 may be used in place of one or more of the patch cords 10 in the high-density application depicted in FIG. 1. As shown in FIG. 2, the patch cord 100 generally includes a cable 102 extending from a first connector 12 at a first end 11 to a second connector 14 at a second end 13. The patch cord 100 also includes a trace assembly 104 provided in the cable 102 between the first end 11 and the second end 13. For example, the trace assembly 104 may be spliced into the cable 102. Also as may be seen in FIG. 2, the trace assembly 104 is spaced from each of the first connector 12 and the second connector 14. In some embodiments, the trace assembly 104 may be proximate one of the first connector 12 and the second connector 14 and distal from the other of the first connector 12 and the second connector 14. For example, in the illustrated embodiment of FIG. 2, the trace assembly 104 is closer to the first connector 12 than to the second connector 14. In various embodiments, the trace assembly 104 may be spaced from the first connector 12 by a distance between about six inches (6") and about three feet (3'), such as between about eight inches (8") and about two feet (2'), such as between about ten inches (10") and about one and a half feet (1.5'), such as about one foot (1'). Locating the trace assembly 104 proximate to one of the connectors 12 and 14 may advantageously assist in identifying which connectors correspond to one another, for example, a user may be able to readily visually determine that the illustrated trace assembly 104 is connected to the same cable 102 as the first connector 12 due to their close proximity. Thus, optically tracing the cable 102 from the trace assembly 104 to the second connector 14 (or, some other point at or near the second end 13) would, in this example, permit the user to ascertain that the second connector 14, which may be one of a plurality of second connectors 14 (e.g., as shown in FIG. 1), is connected to the first connector 12 to which the trace assembly 104 is proximate.

As shown in FIG. 2, the trace assembly 104 may be a first trace assembly, and the patch cord 100 may also have a second trace assembly 105 provided in the cable 102 at a location which is spaced from each of the first connector 12 and the second connector 14. The second trace assembly 105 may be proximate one of the first connector 12 and the second connector 14 and distal from the other of the first connector 12 and the second connector 14. For example, in the illustrated embodiment of FIG. 2, the second trace assembly 105 is closer to the second connector 14 than to the first connector 12. In such embodiments, the patch cord 100 may be traced by emitting light from a light source 200 into one of the first trace assembly 104 or the second trace assembly 105, and detecting the light at the other of the first trace assembly 104 or the second trace assembly 105. In some embodiments, the light may be visible light which may be visually detected at the other of the first trace assembly 104 or the second trace assembly 105. In some embodiments, the light may be visible or non-visible light which may be detected at the other of the first trace assembly 104 or the second trace assembly 105 with a light detector 202, e.g., an optical power meter or other suitable sensor. In other embodiments, only a single trace assembly may be provided, e.g., either one of the first trace assembly 104 and the second trace assembly 105. In embodiments which include only a single trace assembly, the patch cord 100 may be traced by emitting light from a light source 200 into the single trace assembly 104 or 105, and the light may be detected at or near the opposite end of the cable 102 by any suitable means, including providing a visual indicator in the cable 102 or in one of the connectors 12 and 14.

Various devices may provide the light source 200 and/or the light detector 202. In some implementations, features of the light source 200 and the light detector 202 may be provided in the same device, e.g., the light source 200 and the light detector 202 may each be one of a pair of identical devices where each device includes both a light source 200 and a light detector 202. In other instances, the light source 200 and light detector 202 may be distinct devices where at least one of the light source 200 and the light detector 202 is included in a device which does not include the other of a light source or a light detector.

Figure 3:
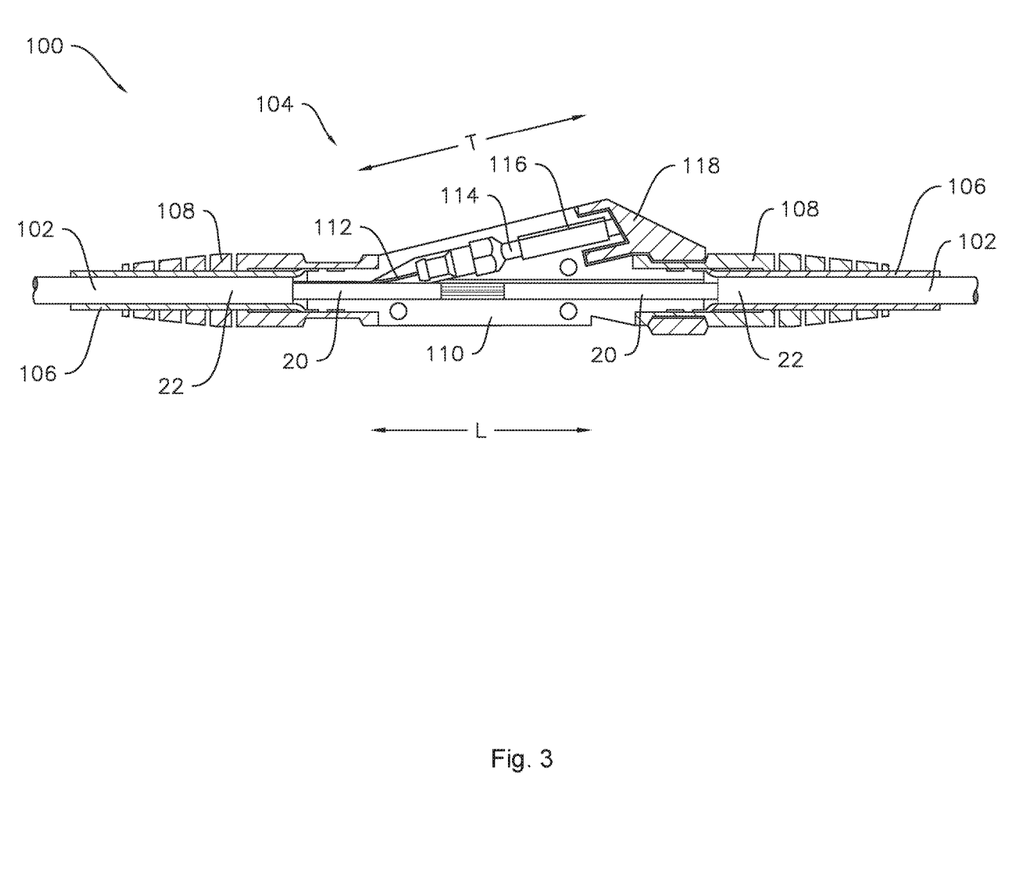
FIG. 3 is a partially sectioned view of a portion of the patch cord of FIG. 2, including a trace assembly provided in the patch cord.
Figure 4:
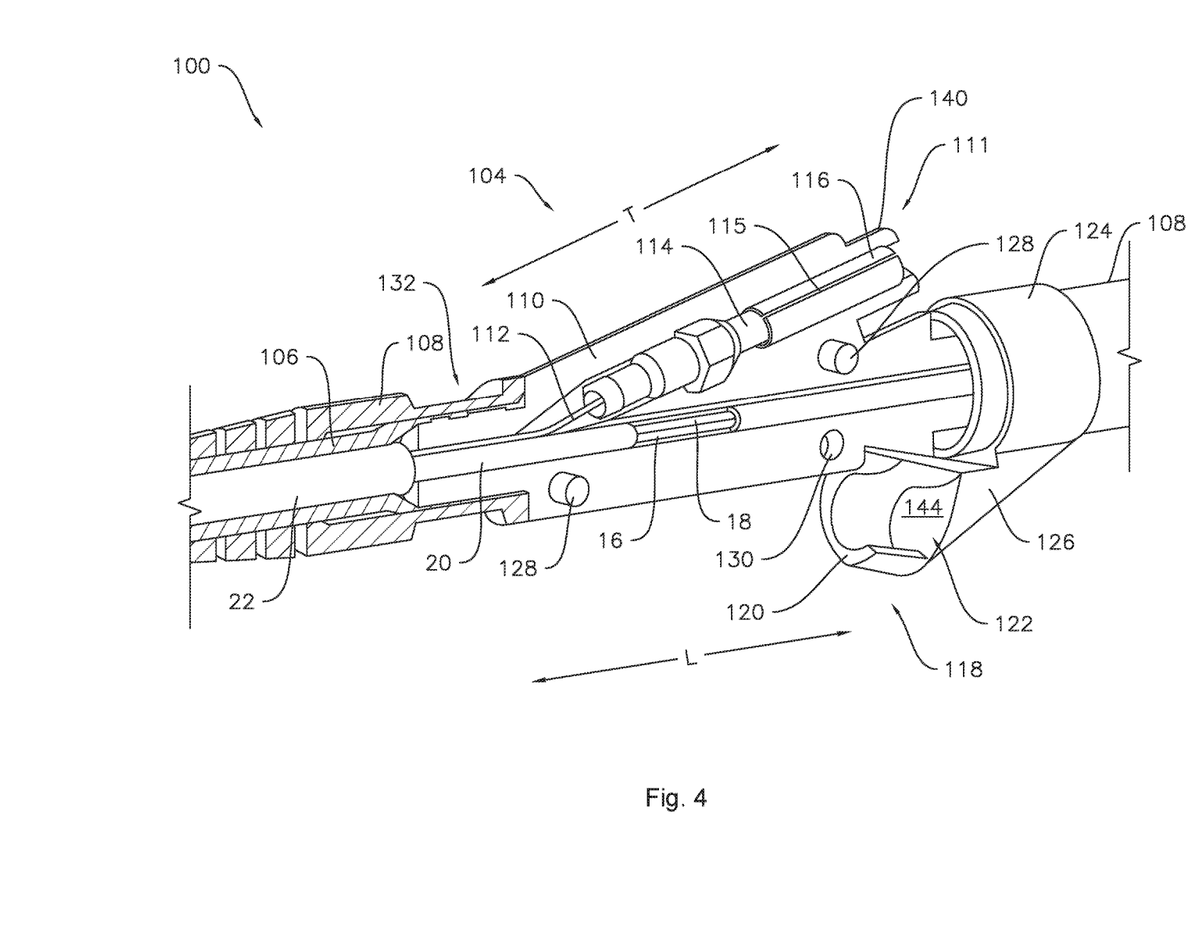
FIG. 4 is a partially sectioned perspective view of the trace assembly of FIG. 3.

Turning now to FIGS. 3 and 4, the patch cord 100 further includes an optical tracing fiber 112. The optical tracing fiber 112 may comprise any suitable light-transmitting material, such as but not limited to glass or plastic. The optical tracing fiber 112 may be an additional optical fiber strand, e.g., as may be seen in FIG. 4, the patch cord 100 may include one or more primary conduits which transmit data as is generally understood in the art. The primary conduits may include at least a first optical fiber 16. As illustrated in FIG. 4, the primary conduits, e.g., data-carrying conduits, may include the first optical fiber 16 and a second optical fiber 18. In other embodiments, any suitable number of primary conduits, e.g., optical fibers, may be utilized. For example, the patch cord 100 including the optical tracing fiber 112 may be a high fiber count cable comprising twelve or more data-carrying optical fibers, such as thirty or more data-carrying optical fibers, such as forty-eight or more data-carrying optical fibers. The first and second optical fibers 16 and 18 are provided by way of example only, the present disclosure may also be used with other types of patch cords, such as patch cords including copper wires which carry electrical signals, e.g., for data and/or power transmission. For example, the present disclosure may also be used with universal serial bus (USB) cables, high-definition multimedia interface (HDMI) cables, or any other similar cord or cable where identifying one cord out of many is desirable.

The optical tracing fiber 112 may extend from the trace assembly 104 to or towards one of the first connector 12 and the second connector 14. For example, in some embodiments, the optical tracing fiber 112 may extend from the trace assembly 104 to the second trace assembly 105 shown in FIG. 2. In such embodiments, the optical tracing fiber 112 may extend from the trace assembly 104 towards the second connector 14 (e.g., in the direction of second connector 14 along the cable 102), but only as far as the second trace assembly 105. The optical tracing fiber 112 may transmit light down the length of the patch cord 100, e.g., from the first trace assembly 104 to the second trace assembly 105 along the cable 102. As mentioned above, the optical tracing fiber 112 may transmit light from any suitable light source 200, for example the light source 200 may be a visual fault locator (VFL) light source which emits visual light. The structure and function of such light sources are understood by those of ordinary skill in the art, and are not shown or described in further detail herein for the sake of clarity.

As may be seen, e.g., in FIGS. 3 and 4, the cable 102 includes an outer jacket 22 and an inner jacket 20. In particular, as shown in FIG. 4, the first and second optical fibers 16 and 18 are within and surrounded by the inner jacket 20. The optical tracing fiber 112 is contained within the outer jacket 22 of the cable 102 and outside of the inner jacket 20. For example, as may be seen in FIGS. 3 and 4, the outer jacket 22 may surround the inner jacket 20 with the optical tracing fiber 112 between the inner jacket 20 and the outer jacket 22.

Figure 6:
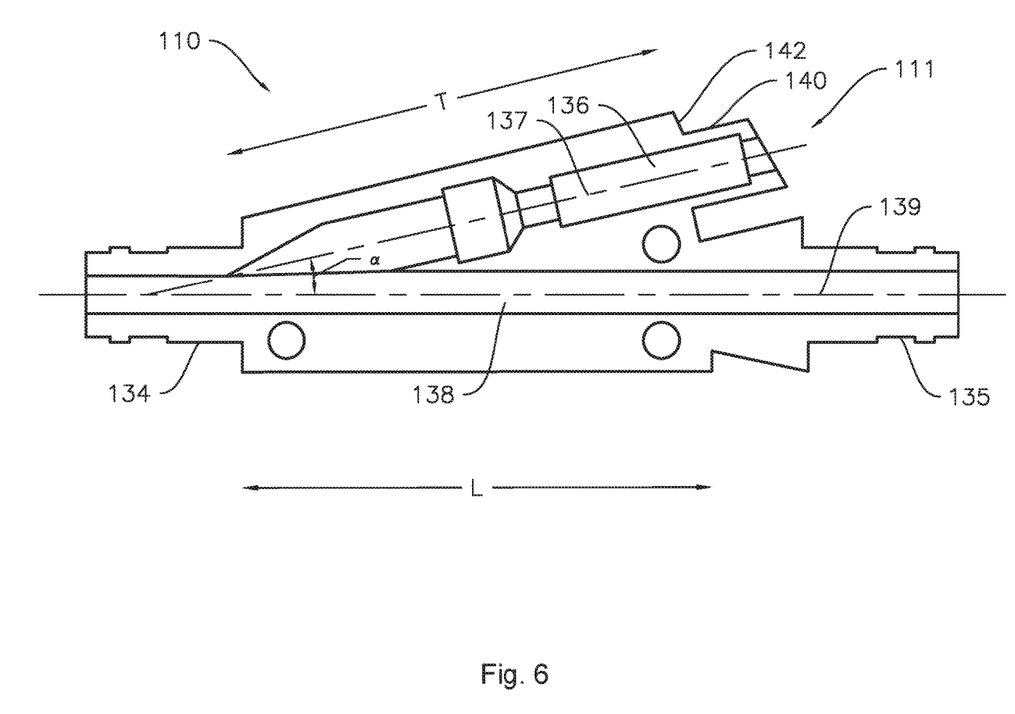
FIG. 6 is a side view of an interface housing according to one or more embodiments of the present disclosure.

The trace assembly 104 includes an interface housing 110. As seen in FIG. 4, the interface housing 110 includes an open end 111 which permits access to an optical receptacle suitable for receiving an optical fiber. For example, the optical receptacle may be a ferrule 114 secured within the interface housing 110, as illustrated in FIG. 4. For example, the ferrule 114 and the interface housing 110, in particular the open end 111 of the interface housing 110, may be configured to provide interoperability with other ferruled connectors, such as ferruled connectors having a diameter of one and a quarter millimeters (ø1.25 mm). In other embodiments, the optical receptacle may be a simple bore in the interface housing 110. As shown in FIG. 6, the open end 111 of the interface housing 110 may be defined in a connection hub 140 with a stop 142 positioned inward of the connection hub 140. For example, the stop 142 may be positioned opposite the open end 111 along the connection hub 140. In various example embodiments, the ferrule 114 may be fixedly mounted within the interface housing 110 by an interference fit, with an adhesive, or the interface housing 110 may be overmolded onto the ferrule 114. As may be seen in FIGS. 3 and 4, the optical tracing fiber 112 may be connected to the ferrule 114. The ferrule 114 may be configured to connect to light source 200 and/or light detector 202, e.g., at an end 115 of the ferrule 114. As mentioned above, the light source 200 may be a VFL light source. An alignment sleeve 116 encapsulates at least a portion of the ferrule 114. In some embodiments, the alignment sleeve 116 may be a spring tube comprising a resilient material, such as a spring steel material. In some embodiments, the spring tube may be a cylinder with a slit that allows the spring tube to expand and contract. The spring tube may also or instead be molded into the interface housing 110.

Figure 5:
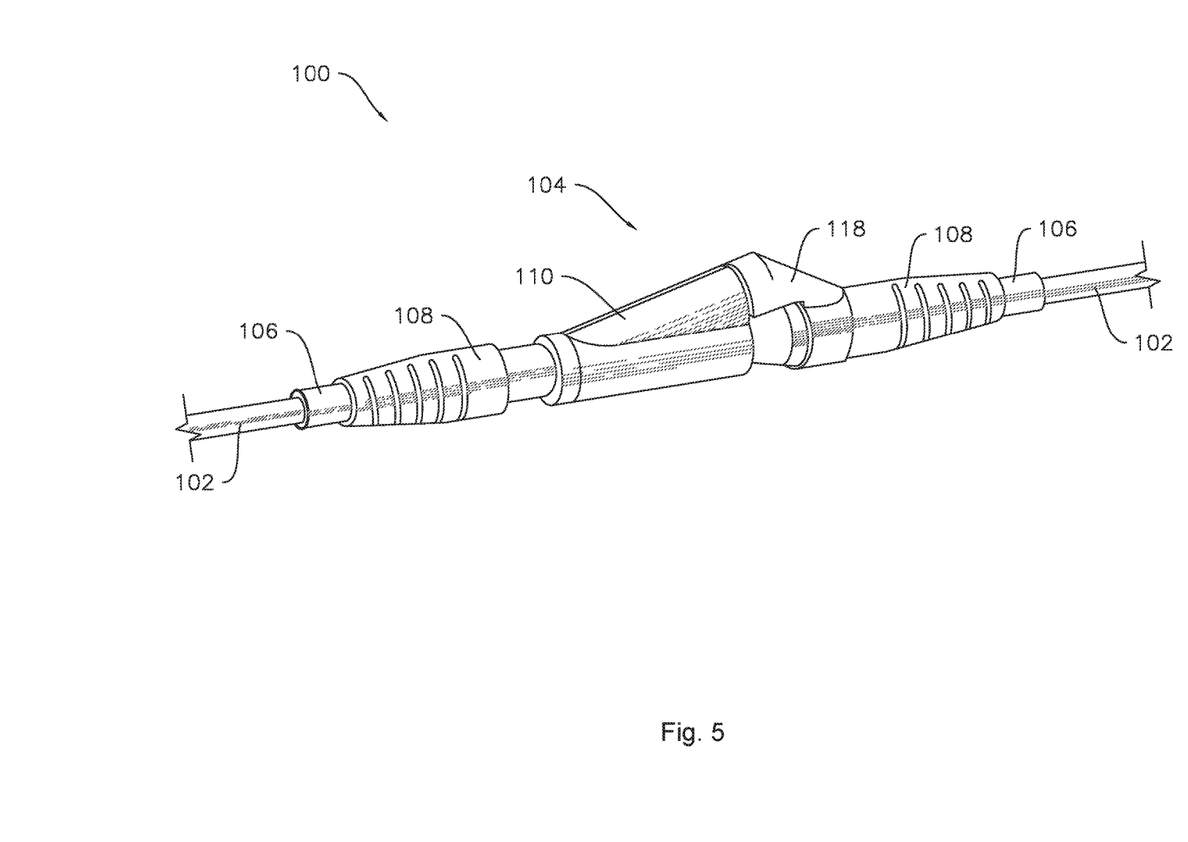
FIG. 5 is a perspective view of a portion of the patch cord of FIG. 2, including the trace assembly in the patch cord.

In the illustrated exemplary embodiments, the interface housing 110 comprises two halves, one of which is illustrated in FIGS. 3, 4, and 6. The two halves are essentially mirror images of one another, with the exception, as best seen in FIG. 4, of protrusions 128 and mating recesses 130. A total of three matching pairs of protrusions 128 and recesses 130 are provided in the two halves of the interface housing 110. As shown in FIG. 4, one half will have two protrusions 128 and one recess 130. One of ordinary skill in the will readily understand that the other half will have two recesses 130 and one protrusion 128. The collective recesses 128 and protrusions 130 on both halves of the interface housing 110 are positioned such that each protrusion 128 on one half of the interface housing 110 corresponds to a recess 130 on the other half, and vice versa. Accordingly, the two halves of the interface housing 110 may be joined together by an interference fit formed between the three matching pairs of protrusions 128 and recesses 130 to form the complete interface housing 110, e.g., as shown in FIG. 5.

In some embodiments, the optically traceable patch cord 100 may include a cap 118 which protects the ferrule 114. For example, the cap 118 may serve to prevent dust from making contact with the ferrule 114. The cap may be configured to selectively cover the end 115 of the ferrule 114 which is configured to connect to the light source 200 and/or light detector 202. For example, in some embodiments, the cap 118 may be rotatably mounted to the trace assembly 104 such that the cap 118 is selectively rotatable between an open position for providing access to the ferrule 114 (FIG. 4) and a closed position wherein the cap 118 covers the end 115 of the ferrule 114 (FIGS. 3 and 5). As may be seen in FIG. 4, the cap 118 may include an annular portion 124 rotatably mounted on the trace assembly 104 (as described in more detail below), a cover wall 120, and a connecting portion 126 extending between the annular portion 124 and the cover wall 120. The cover wall 120 may be generally C-shaped and configured to partially surround the connection hub 140 when the cap 118 is in the closed position. An opening 122 may be defined between the cover wall 120 and an end face 144 of the connecting portion 126. Thus, when the cap 118 rotates from the open position to the closed position, the connection hub 140 passes through the opening 122. When the cap 118 is in the closed position, the connection hub 140 is surrounded by the cover wall 120 and the connecting portion 126. In particular, the open end 111 of the interface housing 110 is enclosed by the end wall 144 when the cap 118 is in the closed position. In some embodiments, the cap 118 may be at least partially translucent or transparent to permit visual detection of light without opening the cap 118. Such embodiments may advantageously prevent or minimize exposure of the interior of the interface housing 110 to contamination, e.g., dust, by minimizing or eliminating the need to open the cap 118. For example, the end wall 144 and/or the connecting portion 126 may be at least partly translucent such that visible light transmitted through optical tracing fiber 112 may be visually detected without opening the cap 118.

As best seen in FIG. 6, the interface housing 110 may include a first crimp area 134 at a first end of the interface housing and a second crimp area 135 at second end of the interface housing 110 opposite the first end of the interface housing 110. As illustrated in FIGS. 3 and 4, the outer jacket 22 and the inner jacket 20 of the cable 102 may be secured to the interface housing 110 at the first and second crimp areas 134 and 135. For example, a connection sleeve 106 may be provided at each crimping area 134 and 135, and the connection sleeves 106 may each surround a portion of the cable 102, as best seen in FIG. 3, and may be crimped to the interface housing 110. In other embodiments, the cable 102 may be connected to the interface housing 110 at each crimping area 134 and 135 without the connection sleeves 106, e.g., the outer jacket 22 may be crimped directly to each crimping area 134 and 135.

A boot 108 surrounds each connection sleeve 106. The boot 108 also provides support to the cable 102 proximate each crimp area 134 and 135, e.g., the boot 108 limits bending of the cable 102. As noted above, the cap 118 may be rotatably mounted to the trace assembly 104. For example, the annular portion 124 of the cap 118 may be mounted on an annular groove 132 (FIG. 4) of one of the crimp boots 108. The annular groove 132 of the crimp boot 108 which does not have the cap 118 mounted thereon is called out in FIG. 4 for the sake of clarity, it is to be understood that the crimp boots 108 are identical, such that the other crimp boot 108 shown in FIG. 4 also includes an annular groove 132 which is not visible in FIG. 4 due to the presence of the annular portion 124 of the cap 118 therein. In such embodiments, the cap 118 may be rotatable around one of the crimp boots 108 to provide access to the ferrule 114 when open and to provide dust protection when closed.

In at least some embodiments, the trace assembly 104 may be formed as a wye connector. For example, as shown in FIGS. 3 and 4, the cable 102 and the primary conduits thereof may extend through the trace assembly 104 along a first direction, e.g., longitudinal direction L, and the ferrule 114 may be oriented along a second direction different from the first direction, e.g., a tracer direction T. In some embodiments, the tracer direction T may be oblique to the longitudinal direction L. The tracer direction T will generally form an angle α with the longitudinal direction L, as shown in FIG. 6. For example, the angle α may be an oblique angle, such as between about five degrees (5°) and about eighty degrees (80°), such as between about fifteen degrees (15°) and about forty-five degrees (45°), such as about thirty degrees (30°). In other embodiments, the tracer direction T may be orthogonal to the longitudinal direction L, e.g., the angle α may be about ninety degrees (90°).

In particular, as shown in FIG. 6, the interface housing 110 may include a first channel 138 extending along the longitudinal direction L from the first crimp area 134 to the second crimp area 135 and a second channel 136 extending along the tracer direction T. In such embodiments, the angle α may be defined between a centerline 139 of the first channel 138 and a centerline 137 of the second channel 136. Also as may be seen in FIG. 6, the second channel 136 may have a varying cross-sectional shape, e.g., to receive the ferrule 114 and alignment sleeve 116 therein. As best seen in FIG. 4, the cable 102 and the primary conduit or conduits, e.g., 16 and 18, may extend through the first channel 138 and the optical tracing fiber 112 may extend from the second channel 136 into the first channel 138.

Figure 7:
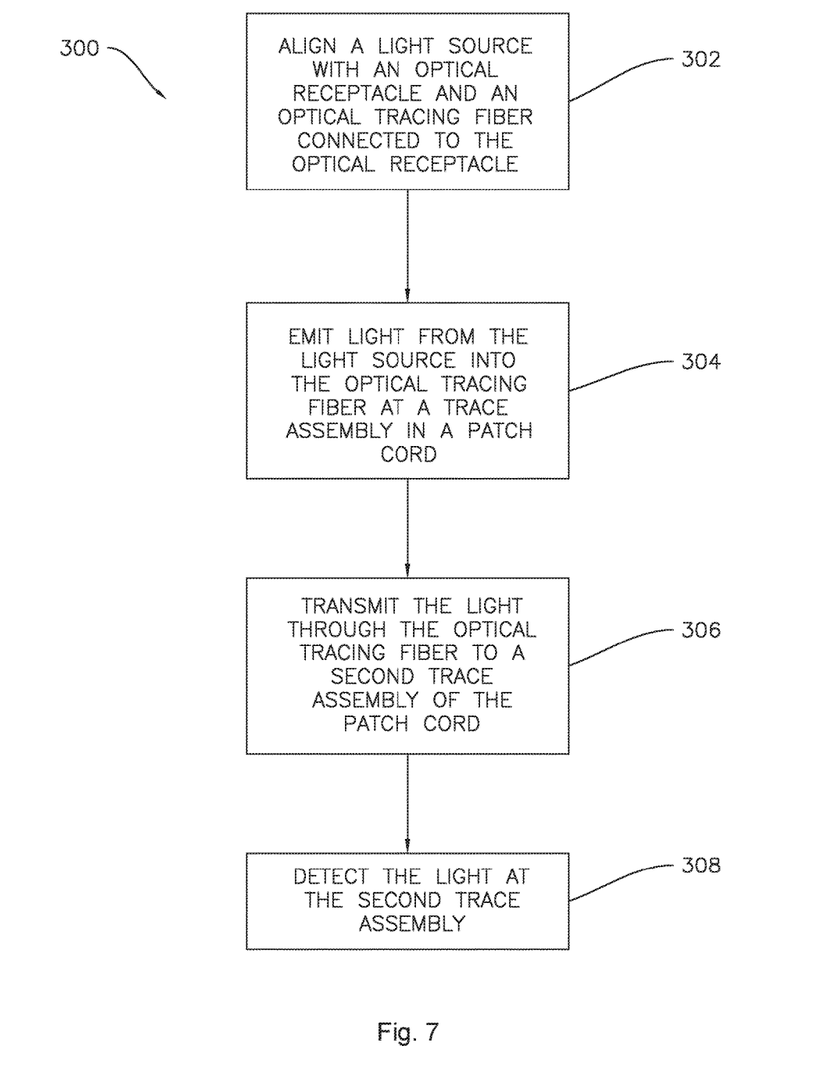
FIG. 7 is a flowchart of an exemplary method of tracing a patch cord according to one or more embodiments of the present disclosure.

Embodiments of the present subject matter also include methods of tracing a patch cord, such as the exemplary method 300 illustrated in FIG. 7. The exemplary method 300 may be usable with patch cords such as the exemplary patch cord 100 described herein, e.g., where the patch cord includes a cable extending from a first connector to a second connector. As shown in FIG. 7, the method 300 may include a step 304 of emitting light into an optical tracing fiber, such as the optical tracing fiber 112 described in the above examples, at a trace assembly, e.g., first trace assembly 104, in the patch cord. The method 300 may also include a step 306 of transmitting the light through the optical tracing fiber to a second trace assembly, e.g., second trace assembly 105.

The transmitted light may be detectable, e.g., with the human eye and/or optical testing equipment such as light detector 202, at the selected trace assembly to which the light is transmitted, whereby a connector, e.g., one of the first and second connector 12 and 14, which is proximate the selected trace assembly to which the light is transmitted may be identified as corresponding to the patch cord which is being traced. Thus, the method 300 may include a step 308 of detecting the light at the second trace assembly.

In some embodiments, the trace assembly may include an optical receptacle, e.g., ferrule 114. In such embodiments, the optical tracing fiber may be connected to the optical receptacle. The method 300 may further include connecting a light source 200, e.g., a VFL light source as mentioned above, to the optical receptacle and the step 304 of emitting light may include emitting light from the light source connected to the optical receptacle into the optical tracing fiber. In various embodiments, the light source 200 may be connected to the optical receptacle, e.g., ferrule 114, with or without making contact with the optical receptacle, e.g., the connection may be a contact or non-contact connection. Thus, one of ordinary skill in the art will recognize that connecting the light source 200 to the optical receptacle includes placing the light source 200 in optical communication with the optical receptacle and may include but does not necessarily include physically connecting the light source to the optical receptacle.

The light source may be aligned with the optical receptacle, e.g., ferrule 114, and the optical tracing fiber connected thereto via an alignment sleeve, e.g., prior to connecting the light source to the optical receptacle. In some embodiments, the alignment sleeve may be a spring tube, e.g., the alignment sleeve may include a generally cylindrical piece of spring steel material. In such embodiments, the step 302 of aligning the light source may include biasing the alignment sleeve with the light source, whereby the light source may be held in alignment with the optical receptacle by the spring force exerted thereon from the spring tube alignment sleeve. For example, as noted above, the slit in the cylindrical spring tube allows the spring tube to expand, e.g., when a ferruled connector is inserted therein, such that the spring material may resiliently engage the ferruled connector of the light source.

The method 300 may also include removing a protective cap, e.g., cap 118 described above, from an end of the optical receptacle prior to connecting the light source to the optical receptacle. In such embodiments, the steps of connecting the light source to the optical receptacle and/or aligning the light source with the optical receptacle may include connecting or aligning the light source with the end of the optical receptacle. For example, the protective cap may be rotatable, such that the step of removing the protective cap may include rotating the protective cap from a closed position to an open position. In some embodiments, rotating the protective cap may include rotating the protective cap about an interface housing of the trace assembly.

Those of ordinary skill in the art will recognize that the patch cord 100 according to the present subject matter provides numerous advantages. For example, the patch cord 100 includes features that provide fast identification and traceability of both ends (e.g., both connectors 12 and 14) of the patch cord 100 in high density applications. As another example, the present subject matter may be applicable to any length of cable 102. The present subject matter is also advantageous in that the tracing features provided are compatible with any commonly available VFL equipment and in that the interface housing 110 may be connected to an industry standard LC connector. As yet another example, the present subject matter provides a small outside cable diameter, allowing for high density applications. The assembly method for the optically traceable patch cord 100 may advantageously utilize a standard manufacturing process including readily available tools, ferrule, and standard crimping and assembly techniques, and may also provide for fast and low-cost assembly. The optical tracing fiber 112 is advantageously usable on any fiber cable, regardless of the connector interface, e.g., first and second connector 12 and 14 may be any type of connector. The optical tracing fiber 112 is also advantageously usable on any fiber count cable assemblies, e.g., in addition to the first and second fibers 16 and 18 described in the above examples, third, fourth, etc., fibers may be provided in any amount.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An optical traceable patch cord, comprising:
a cable extending from a first connector at a first end to a second connector at a second end;
a trace assembly provided in the cable between the first end of the cable and the second end of the cable, the trace assembly proximate the first connector and spaced from each of the first connector and the second connector, the trace assembly comprising an interface housing, extending from a first crimp area at a first end of the interface housing to a second crimp area at a second end of the interface housing, the cable comprising an outer jacket secured to the interface housing at the first and second crimp areas; and
an optical fiber extending from the trace assembly towards the second end of the cable.

2. The optical traceable patch cord of claim 1, wherein the trace assembly comprises an optical receptacle, the optical fiber extending from the optical receptacle towards the second end of the cable, the optical receptacle configured to connect to a light source.

3. The optical traceable patch cord of claim 2, further comprising an alignment sleeve encapsulating the optical receptacle.

4. The optical traceable patch cord of claim 3, wherein the alignment sleeve comprises a spring steel material.

5. The optical traceable patch cord of claim 2, wherein the optical receptacle comprises a ferrule fixedly mounted within the interface housing.

6. The optical traceable patch cord of claim 5, wherein the trace assembly further comprises a connection sleeve surrounding the cable and crimped to the interface housing.

7. The optical traceable patch cord of claim 2, wherein the optical receptacle is configured to connect to the light source at an end of the optical receptacle, further comprising a cap configured to selectively cover the end of the optical receptacle configured to connect to the light source.

8. The optical traceable patch cord of claim 7, wherein the cap is rotatable mounted to the trace assembly, whereby the cap is selectively rotatable between an open position for providing access to the optical receptacle and a closed position wherein the cap covers the end of the optical receptacle.

9. The optical traceable patch cord of claim 2, wherein the cable extends along a first direction through the trace assembly and the optical receptacle is oriented along a second direction oblique to the first direction.

10. The optical traceable patch cord of claim 1, wherein the trace assembly is a first trace assembly, further comprising a second trace assembly provided in the cable proximate the second connector and spaced from each of the first connector and the second connector, the optical fiber extending from the first trace assembly to the second trace assembly.

11. A method of tracing a patch cord, the patch cord comprising a cable extending from a first connector to a second connector, the method comprising:
emitting light into an optical tracing fiber at a trace assembly in the patch cord, the trace assembly spaced from each of the first connector and the second connector and proximate the first connector, the trace assembly comprising an interface housing extending from a first crimp area at a first end of the interface housing to a second crimp area at a second end of the interface housing, the cable comprising an outer jacket secured to the interface housing at the first and second crimp areas; and
transmitting the light through the optical tracing fiber towards the second connector.

12. The method of claim 11, wherein the trace assembly is a first trace assembly, the step of transmitting the light comprises transmitting the light to a second trace assembly spaced from each of the first connector and the second connector and proximate the second connector, and the method further comprises detecting the light at the second trace assembly.

13. The method of claim 11, wherein the trace assembly comprises an optical receptacle, the optical tracing fiber is connected to the optical receptacle, and wherein the method further comprises connecting a light source to the optical receptacle and the step of emitting light comprises emitting light from the light source connected to the optical receptacle into the optical tracing fiber.

14. The method of claim 13, further comprising aligning the light source with the optical receptacle through an alignment sleeve encapsulating the optical receptacle prior to connecting the light source to the optical receptacle.

15. The method of claim 14, wherein the alignment sleeve comprises a spring steel material, and wherein the step of aligning comprises biasing the alignment sleeve with the light source.

16. The method of claim 13, further comprising removing a protective cap front an end of the optical receptacle prior to connecting the light source to the optical receptacle, wherein the step of connecting the light source to the optical receptacle comprises connecting the light source to the end of the optical receptacle.

17. The method of claim 16, wherein the step of removing the protective cap comprises rotating the protective cap.

18. The method of claim 17, wherein the step of removing the protective cap further comprises rotating the protective cap about the interface housing of the trace assembly.

* * * * *